(12) United States Patent
Lynch

(10) Patent No.: US 9,562,779 B2
(45) Date of Patent: Feb. 7, 2017

(54) METHOD AND APPARATUS FOR PROVIDING A STEERING RELIABILITY MAP BASED ON DRIVEN CURVATURES AND GEOMETRY CURVATURE

(71) Applicant: HERE Global B.V., Veldhoven (NL)

(72) Inventor: James D. Lynch, Chicago, IL (US)

(73) Assignee: HERE GLOBAL B.V., Veldhoven (NL)

( * ) Notice: Subject to any disclaimer, the term of this patent is extended or adjusted under 35 U.S.C. 154(b) by 42 days.

(21) Appl. No.: 14/581,134

(22) Filed: Dec. 23, 2014

(65) Prior Publication Data
US 2016/0178381 A1    Jun. 23, 2016

(51) Int. Cl.
| G05B 11/01 | (2006.01) |
| G01C 21/30 | (2006.01) |
| G01C 21/34 | (2006.01) |
| G05D 1/00 | (2006.01) |
| B62D 15/02 | (2006.01) |
| G01C 21/32 | (2006.01) |
| G05D 1/02 | (2006.01) |

(52) U.S. Cl.
CPC ............ *G01C 21/30* (2013.01); *B62D 15/025* (2013.01); *G01C 21/32* (2013.01); *G01C 21/3407* (2013.01); *G05D 1/0088* (2013.01); *G05D 1/0274* (2013.01)

(58) Field of Classification Search
CPC ... G01C 21/30; G01C 21/3407; B62D 15/025; G05D 1/0088
USPC .............................. 701/1, 23, 24, 25, 26, 27
See application file for complete search history.

(56) References Cited

U.S. PATENT DOCUMENTS

| 6,070,121 A | 5/2000 | Matsuda |
| 6,718,259 B1* | 4/2004 | Khosla ................... G01C 21/26 340/435 |
| 8,184,159 B2* | 5/2012 | Luo ..................... G06K 9/00798 348/148 |
| 8,755,967 B1* | 6/2014 | Ferguson ................ G01S 17/89 180/167 |
| 8,825,265 B1* | 9/2014 | Ferguson ............. G05D 1/0212 701/23 |

(Continued)

FOREIGN PATENT DOCUMENTS

| DE | 102008012697 A1 | 6/2009 |
| EP | 1255091 A1 | 11/2002 |
| EP | 2340975 A1 | 7/2011 |

OTHER PUBLICATIONS

European Office Action for related European Patent Application No. 15202559.9-1557 dated May 31, 2016, 10 Pages.

*Primary Examiner* — Jaime Figueroa
(74) *Attorney, Agent, or Firm* — Ditthavong & Steiner, P.C.

(57) ABSTRACT

An approach is provided for comparing experienced curvatures with geometry-based curvatures to identify road environments. The approach involves causing, at least in part, an aggregation of a plurality of curvature samples collected from one or more vehicles traversing one or more travel segments. The approach also involves processing and/or facilitating a processing of the curvature samples to determine at least one experienced curvature for the one or more travel segments. The approach further involves determining at least one geometry-based curvature for the one or more travel segments. The approach also involves determining one or more differences between at least one experienced curvature and the at least one geometry-based curvature.

20 Claims, 15 Drawing Sheets

(56) References Cited

U.S. PATENT DOCUMENTS

| | | | | |
|---|---|---|---|---|
| 9,189,897 | B1* | 11/2015 | Stenneth | G07C 5/008 |
| 9,229,453 | B1* | 1/2016 | Lee | G05D 1/0214 |
| 2005/0225477 | A1* | 10/2005 | Cong | B60K 31/0008 |
| | | | | 342/70 |
| 2010/0082307 | A1* | 4/2010 | Dorum | G01C 21/30 |
| | | | | 703/2 |
| 2010/0106356 | A1* | 4/2010 | Trepagnier | G01S 17/023 |
| | | | | 701/25 |
| 2010/0253594 | A1* | 10/2010 | Szczerba | G01S 13/723 |
| | | | | 345/7 |
| 2010/0292886 | A1* | 11/2010 | Szczerba | G01C 21/365 |
| | | | | 701/31.4 |
| 2014/0236482 | A1 | 8/2014 | Dorum et al. | |
| 2014/0244125 | A1* | 8/2014 | Dorum | G01C 21/32 |
| | | | | 701/70 |
| 2015/0151751 | A1* | 6/2015 | Clarke | B60W 30/00 |
| | | | | 701/28 |
| 2015/0353085 | A1* | 12/2015 | Lee | B60W 30/10 |
| | | | | 701/533 |
| 2016/0018229 | A1* | 1/2016 | Lee | B60W 30/10 |
| | | | | 701/409 |
| 2016/0026182 | A1* | 1/2016 | Boroditsky | H04L 67/306 |
| | | | | 701/23 |

* cited by examiner

300

400

500

700

METHOD AND APPARATUS FOR PROVIDING A STEERING RELIABILITY MAP BASED ON DRIVEN CURVATURES AND GEOMETRY CURVATURE

BACKGROUND

There has been an increasing interest in the development of vehicles that are able to partially drive or operate themselves based on geometrical map data without any input from vehicle users. However, the geometrical map data implemented by autonomous vehicles does not assess the safety and reliability of data pertaining to road situations, or assist in predictive maneuvers (e.g., reverting to manual control in unstable or dangerous road situations). As a result, service providers and device manufacturers face significant technical challenges in providing a service that ascertains accurate road conditions and recommends a safe driving maneuver.

SOME EXAMPLE EMBODIMENTS

Therefore, there is a need for an approach that compares experienced curvatures with geometry-based curvatures to identify road environments.

According to one embodiment, a method comprises causing, at least in part, an aggregation of a plurality of curvature samples collected from one or more vehicles traversing one or more travel segments. The method also comprises processing and/or facilitating a processing of the curvature samples to determine at least one experienced curvature for the one or more travel segments. The method further comprises determining at least one geometry-based curvature for the one or more travel segments. The method also comprises determining one or more differences between at least one experienced curvature and the at least one geometry-based curvature According to another embodiment, an apparatus comprises at least one processor, and at least one memory including computer program code, the at least one memory and the computer program code configured to, with the at least one processor, cause, at least in part, the apparatus to cause, at least in part, an aggregation of a plurality of curvature samples collected from one or more vehicles traversing one or more travel segments. The apparatus is also caused to process and/or facilitate a processing of the curvature samples to determine at least one experienced curvature for the one or more travel segments. The apparatus is further caused to determine at least one geometry-based curvature for the one or more travel segments. The apparatus is also caused to determine one or more differences between at least one experienced curvature and the at least one geometry-based curvature.

According to another embodiment, a computer-readable storage medium carries one or more sequences of one or more instructions which, when executed by one or more processors, cause, at least in part, an aggregation of a plurality of curvature samples collected from one or more vehicles traversing one or more travel segments. The apparatus is also caused to process and/or facilitate a processing of the curvature samples to determine at least one experienced curvature for the one or more travel segments. The apparatus is further caused to determine at least one geometry-based curvature for the one or more travel segments. The apparatus is also caused to determine one or more differences between at least one experienced curvature and the at least one geometry-based curvature.

According to another embodiment, an apparatus comprises means for causing, at least in part, an aggregation of a plurality of curvature samples collected from one or more vehicles traversing one or more travel segments. The apparatus also comprises means for processing and/or facilitating a processing of the curvature samples to determine at least one experienced curvature for the one or more travel segments. The apparatus further comprises means for determining at least one geometry-based curvature for the one or more travel segments. The apparatus also comprises means for determining one or more differences between at least one experienced curvature and the at least one geometry-based curvature.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining differences between an experienced curvature and a geometric-based curvature are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to an autonomous vehicle, it is contemplated that the approaches of the various embodiments described herein are applicable to highly-assisted driving (HAD) vehicles as well as to vehicles for which an operational configuration can be determined or recommended. Moreover, although the autonomous vehicles described are autonomous automobiles, it is contemplated that the approaches of the various embodiments described herein are applicable to any type of passenger vehicles.

Figure 1:
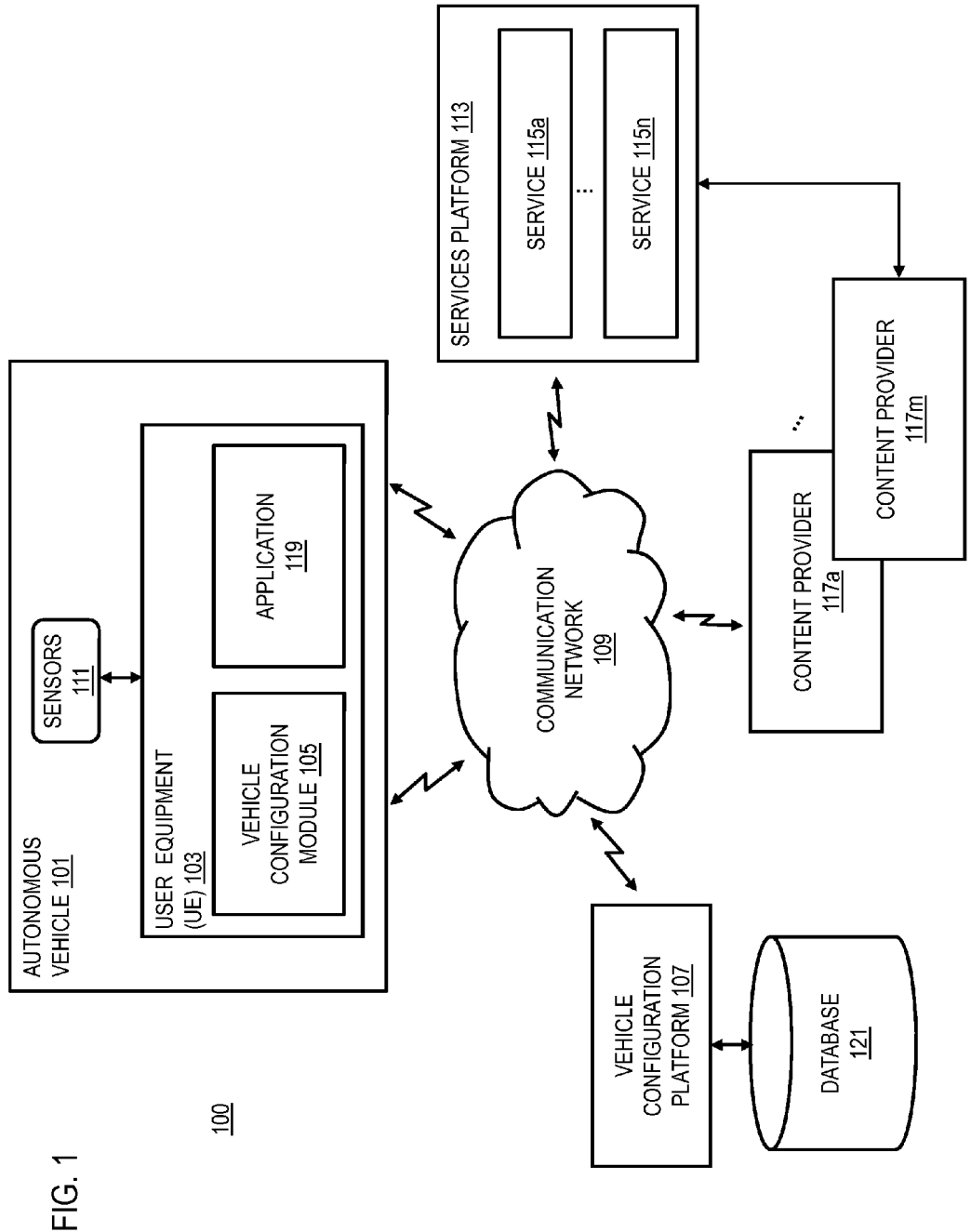
FIG. 1 is a diagram of a system capable of providing a steering reliability map based on a user driving curvature for an autonomous vehicle, according to one embodiment.

FIG. 1 is a diagram of a system capable of determining differences between an experienced curvature and a geometric-based curvature, according to one embodiment. As noted above, some autonomous vehicles are able to drive themselves without the input of vehicle passengers or occupants. In some embodiments, autonomous vehicles achieve this self-driving capability by using sensor systems in combination with, for instance, map data (e.g., three-dimensional map data) and information received from network-based services and/or other vehicles. With this information, the vehicle might react to changing situations faster than a typical human driver. As a result, autonomous vehicles are able to safely operate using operational configurations (e.g., vehicle speed, acceleration rate, braking rate, etc.) and plan an appropriate route using at least one of map data or driver experience data.

For example, autonomous vehicles may maintain high speeds in traffic under varying conditions and plan an appropriate route with minimal driver input. However, this speed and route (or other operational configuration parameter) of the autonomous vehicle may be compromised in some instances. As discussed above, at least some discomfort or inefficiency may be based on the discrepancy between geometrical map data based purely on the map route and a manual driven route based on user experience in various situations. For example, this disparity can lead to the autonomous vehicle driving in a very abrupt manner such as for a roundabout or highway exit or driving in conditions that are unstable or dangerous such as for poor road conditions, construction areas, park cars, and other such situations where human decision making would supersede the driving of a road geometry path. Such a conflict can cause discomfort for the passengers and in some cases, lead to one or more of the passengers interfering with the autonomous driving activity (e.g., by hitting a panic button to stop the autonomous driving activity), thereby resulting in a poor user experience.

To address this problem, a system 100 of FIG. 1 introduces the capability to determine the differences between an aggregation of a plurality of curvature samples collected from one or more vehicles and a geometry-based curvature for one or more road segments of the passengers or occupants. For example, in one embodiment, the system 100 aggregates a plurality of driving samples from one or more vehicles traversing one or more travel segments. In one embodiment, the system 100 determines the geometry-based curvature of road segments using available map data and/or network information to designate the path of the road as received. The system 100 processes the aggregated driving samples to determine at least one experienced curvature for one or more travel segments. In addition, the system 100 processes information from a network such as crowd source data or sensor data from one or more vehicles to designate an experienced curvature. The system 100 then, for instance, sets, recommends, or determines travel segments in which the experienced curvature is different from the geometry-based curvature as designated by an a priori threshold value. In one embodiment, the path differences can be determined to be above a threshold value to identify one or more errors in the geometry based curvature including free-form travel areas, lane change areas, merge areas, object avoidance areas or other like problem areas. Although the various embodiments described herein are discussed with road curvature differences in mind, it is contemplated that the approaches described herein as related to geometry-based vs. experience also have related implications to other operational configuration parameters such as speed rate, acceleration rate, braking rate, steering rate, cornering forces, and the like.

In an example use case, an autonomous vehicle is traveling about a roundabout and plans to exit right after proceeding a quarter of the circle. The system simultaneous determines that a geometry-based curvature necessitates the vehicle follow a counterclockwise circle before making a sharp right to the exit and, further, that an experienced-based curvature clusters to an oppositely curved arc that is an almost mirror image to the geometry-based curvature followed by a smooth rightward exit. The difference between the geometry-based route and the experienced-based route is determined to the greater than a threshold value and therefore significant for designation as an area of possible error. Thus, this identification may lead to a reversion to a manual configuration so that the at least one occupant can follow an appropriate path that is not confounded by strict adherence to road geometry. Or, another option may be possible, such as to determine the relative comfort of each option or compromise between the geometry-based and experienced based configuration. Thus, by providing a determination of problem travel areas, the system 100 can potentially reduce user discomfort and improve safety while riding in an autonomous vehicle.

As shown in FIG. 1, the system 100 comprises an autonomous vehicle 101 configured with at least one user equipment (UE) 103 including a vehicle configuration module 105 that provides functions related to determining differences between an experienced curvature and a geometric-based curvature for the autonomous vehicle 101 using geometrical mapping data, crowd source data, and/or sensor data in the various embodiments discussed herein. In one embodiment, the autonomous vehicle 101, the UE 103, and/or the vehicle configuration module 105 has connectivity to a vehicle configuration platform 107 over a communication network 109. By way of example, the vehicle configuration platform 107 may be a network component that can perform all or a portion of the functions of the vehicle configuration module 105 which is a component local to the UE 103.

By way of example, the UE 103 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 103 can support any type of interface to the user (such as "wearable" circuitry, etc.). In one embodiment, the one or more vehicles may have cellular or Wi-Fi connection either through the inbuilt communication equipment or from the UE 103 associated with the vehicles. The application 119 may assist in conveying sensor information via the communication network 107.

Although the UE 103 is depicted as a separate component from the autonomous vehicle 101, it is contemplated that the functions of the UE 103 and/or the vehicle configuration module 105 may be performed or embedded in the autonomous vehicle 101 or a component of the autonomous vehicle 101. As shown, the autonomous vehicle 101 is further configured with the sensors 111 to assist with autonomous driving. For example, the sensors 111 may include motion sensors, visual sensors including infrared sensors, lasers, radar, sonar, cameras (e.g., visible, night vision, etc.), and/or other devices/sensors that can scan and record data for the autonomous vehicle 101's surroundings to provide information to determine differences between an experienced curvature and a geometric-based curvature for the autonomous vehicle 101.

In one embodiment, the sensor information can be supplemented with additional information from network-based services such as those provided by the services platform 113 and the services 115*a*-115*n* (also collectively referred to as services 115). By way of example, the services 115 can include mapping service, navigation services, and/or other data services that provide data for estimating geometry-based map data and/or crowd sourced data including sensor data related to driving habits. In one embodiment, the services platform 113 and/or the services 115 can provide contextual information such weather, traffic, etc. as well as facilitate communications (e.g., via social networking services, messaging services, crowdsourcing services, etc.) among vehicles to share configuration information. In one embodiment, the services platform 113 and/or the services 115 interact with content providers 117*a*-117*m* that provide content data (e.g., map data, crowd source data, imaging data, etc.) to the services platform 113 and/or the services 115. In one embodiment, the UE 103 executes an application 119 that acts as client to the services platform 113, the services 115, the vehicle configuration module 105, and/or the vehicle configuration platform 107. In one embodiment, the curvature data, crowd source data, variable confidence data, threshold data, sensor data, contextual information, and/or configuration information can be stored in the database 121 for use by the vehicle configuration module 105 and/or the vehicle configuration platform 107.

As described above, in one embodiment, the system 100 may include an aggregation of a plurality of curvature samples collected from one or more vehicles traversing one or more travel segments and subsequently processing and/or facilitating a processing of the curvature samples to determine at least one experienced curvature for the one or more travel segments. For example, the experienced curvature data may be incorporated into the on-board system, gathered from a network, as well as gathered from a variety of sources to amalgamate a crowd source dataset. Furthermore, the system 100 may also include geometry-based curvature data for the one or more travel segments, which likewise may be incorporated into an on-board system, gathered from a network, or sourced from a variety of aggregated datasets. These aforementioned data sources could include sensor data, mapping data, user preference data, or other relevant datasets. As explained previously, the difference data calculated from the geometry-based and experienced curvature data can then be used to determine differences for a variety of situations including as related to travel segments such as one or more roundabouts, free-form travel areas, lane change areas, merge areas, object avoidance areas, and/or other like problem areas.

Figure 12:
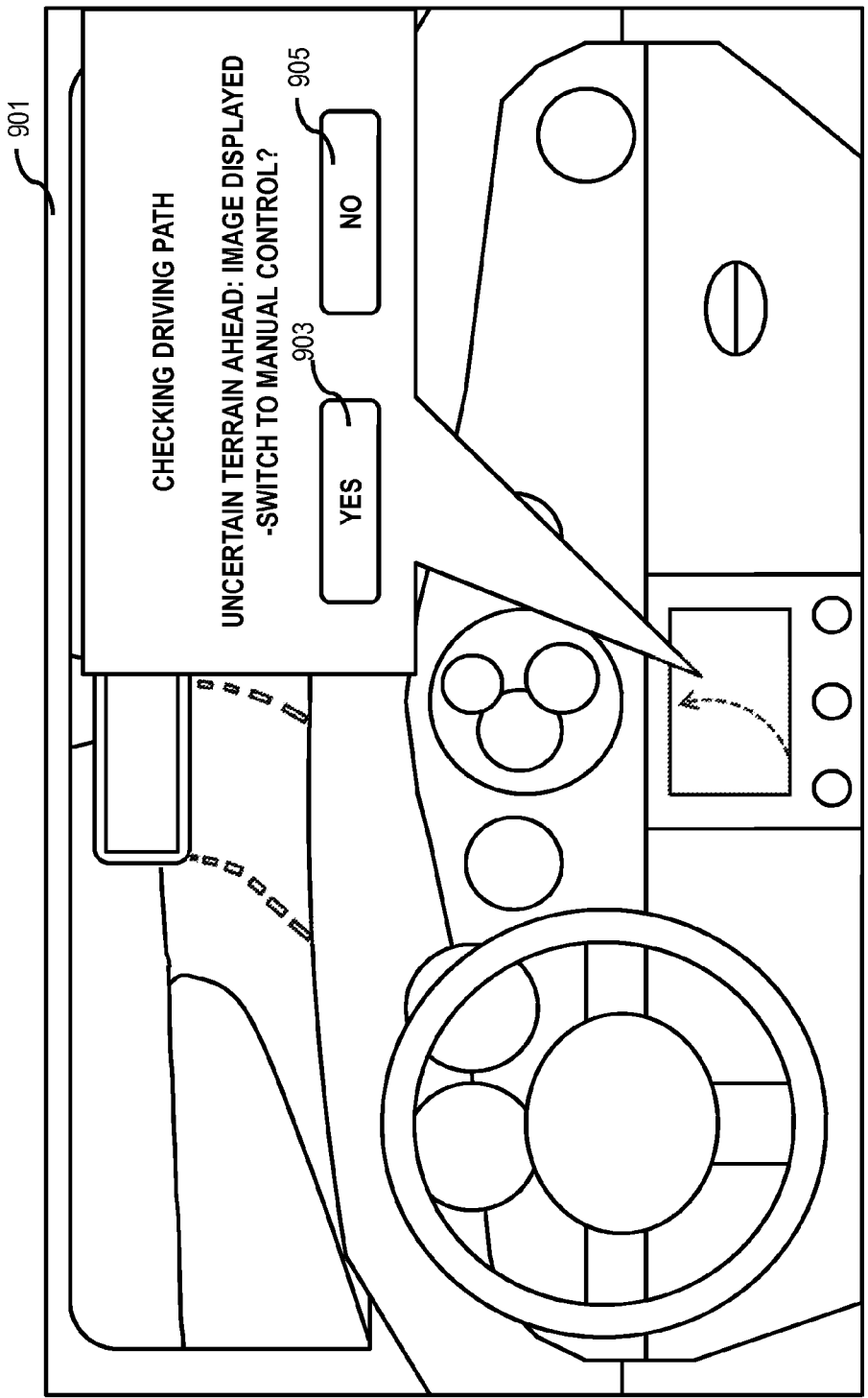
FIG. 12 is a user interface diagram that represents the selection of manual control in a potential problem area according to on-board selection menus, according to one embodiment.

For example, a user may be traveling in the autonomous vehicle 101 to a location with numerous curved roads. The geometry-based data of the system maintains the vehicle in a precise path along the geometry of the road and mostly parallel to the center lines and/or shoulder lines. However, for the user, the path is inadequate to the conditions and is both uncomfortable and less efficient for navigating around tight turns. Thus, the system 100 may identify this travel segment as including a path difference at a threshold to be identified as either uncertain or warranting a deviation from the geometry-based path or requiring the at least from occupant to choose from at least several options such as manual control, a selection of geometry or driven curvature, or among several clusters of possible routes. In one embodiment, this may be done using an on-board interactive display as shown in FIG. 12, which can further incorporate user data into the system 100 using selection algorithms. Therefore, the system 100, once calibrated, can automatically modify acceleration, braking, and/or speed parameters based on these inputs and determine a viable route for the at least one vehicle. In another embodiment, the system 100 may prompt the user to choose a particular set of source data to identify problem areas and relevant routes. The system 100 can then navigate more efficiently by including such user inputs in addition to the automated curvature calculations and difference calculations for the at least one vehicle.

In one embodiment, the system 100 may cause a mapping of the differences of the experienced curvature, the geometry-based curvature or a combination thereof. This curvature information may be preprogrammed, inputted manually, inputted as prompted by the user interface, gathered from sensor data, or accessed from a network. The system 100 can then process this data to take account of the discrepancies between geometry and experienced curvature to generate a map of potential problem areas. In one scenario, the system 100 may perceive that a winding mountain road generates experienced curvature data to suggest wider turns than catalogued for the geometrical data set. The system 100 can then designate the area as uncertain and make an automatic decision based on preprogramming or prompt the user for an input. In another scenario, there may be a difference determined in a high frequency lane change area. Likewise, the system 100 may stay with one or a combination of the geometrical route, the experienced route, or prompt the user to choose manual control. The system 100 can also weight the relative options differently and further can collect, calibrate, and integrate this information with vehicle systems to achieve a user approved option. As with several other embodiments, this difference data can be used to indicate sources of error in such areas as free-form travels areas, lane change areas, merge areas, or object avoidance areas among others and provide feedback for an updating of the system 100.

In one embodiment, the system 100 may cause an assignment of a confidence value to a travel area. The system 100 may include a value that is above or below a prescribed threshold and furthermore prescribe a confidence level—internally or displayed to a user. The system 100 may further determine whether to designate the travel segment as a high reliability area, unstable segment, variable reliability, or other like designations. Furthermore, uncertainty can be assigned to the location by providing an unstable steer designation to the travel segment. In one scenario, the difference may be stored internally or displayed on the console to let the user decide whether to use manual control, or choose from viable route choices. Updates to the system 100 may be inputted manually, prompted by the user interface, or processed automatically as sensor or crowd source data. The update may also be held in the user data base as feedback information to incorporate into future driving experiences. In one scenario, the system 100 may prompt the user to specify a particular threshold value to use in designating a travel segment as uncertain. This specified segment thus results in an updated system 100 configuration. In another scenario, sensor data related contextual information or crowd source information may be accessed to be processed as feedback information to update the system 100 travel segment designations.

In one embodiment, the system 100 may cause an association of the differences with the one or more locations associated with the differences that are above at least one difference threshold value for a given disparity between the geometry-based curvature and experienced curvature. Considering these differences with the corresponding travel segments, the system 100 may further cluster the data based on relative frequencies, steering behavior information, acceleration behavior information, braking behavior information, or a combination thereof of the one or more vehicles. The system 100 may include selection algorithms and/or present a choice to the user to choose one or more of a cluster of experienced curvatures. In one scenario, the system 100 may already include various inputs related to the experienced curvature. The occupant may not be satisfied with the choice given and prefer another travel route which may be another high frequency difference segment and not simply an average of one or more experienced curvature data sets. Such updates may be processed manually, when prompted by the user interface, or in conjunction with crowd source data or sensor data. In one scenario, the update may also be held in a data base as feedback information to incorporate into future driving experiences.

By way of example, the communication network 109 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 103 is any type of embedded terminal, mobile terminal, fixed terminal, or portable terminal including a vehicle control unit, a head unit, a portable navigation device (PND), a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.).

By way of example, the autonomous vehicle 101, the UE 103, the vehicle configuration module 105, the vehicle configuration platform 107, the sensors 111, and the application 119 communicate with each other and with other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

By way of example, the sensors 111 may be any type of sensor to detect information about the environment surrounding the autonomous vehicle 101. The sensor system 111 may include sensors configured to monitor internal systems of the autonomous vehicle 101 (e.g., $O_2$ monitor, fuel gauge, engine oil temperature, wheel speed sensors, etc.). One or more of the sensors 111 may be configured to be actuated separately or collectively in order to modify a position and/or an orientation of the one or more sensors 111. In some embodiments, the sensor system 111 may include an inertial measurement unit, a laser rangefinder/LIDAR unit, a radar unit, infrared, an image gathering device such as a camera, or a microphone. In certain embodiments, the sensors 111 may include, for example, a global positioning sensor for gathering location data (e.g., GPS), a health sensor (e.g. heart-rate monitor, blood pressure monitor, etc.), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, and the like.

In one embodiment, the sensors 111 may include, orientation sensors augmented with height sensor and acceleration sensor, tilt sensors to detect the degree of incline or decline of the vehicle along a path of travel, light sensors, moisture sensors, pressure sensors, audio sensors (e.g., microphone), etc. In another example embodiment, the sensors 111 may detect weather data, passenger status (e.g., the number of passengers actively seated), etc. Further, sensors about the perimeter of the vehicle may detect the relative distance of the vehicle from sidewalks, lane or roadways, the presence of other vehicles, trees, benches, water, potholes and any other objects, or a combination thereof. Still further, the one or more sensors may provide in-vehicle navigation services, wherein one or more location based services may be provided to the at least one UE 103 associated with the at least one user of the vehicle and/or at least one other UE 103 associated with the autonomous vehicle 101.

In one embodiment, the vehicle configuration platform 107 may be a platform with multiple interconnected components. The vehicle configuration platform 107 may include multiple servers, intelligent networking devices, computing devices, components and corresponding software for determining differences between an experienced curvature and a geometric-based curvature.

Figure 2:
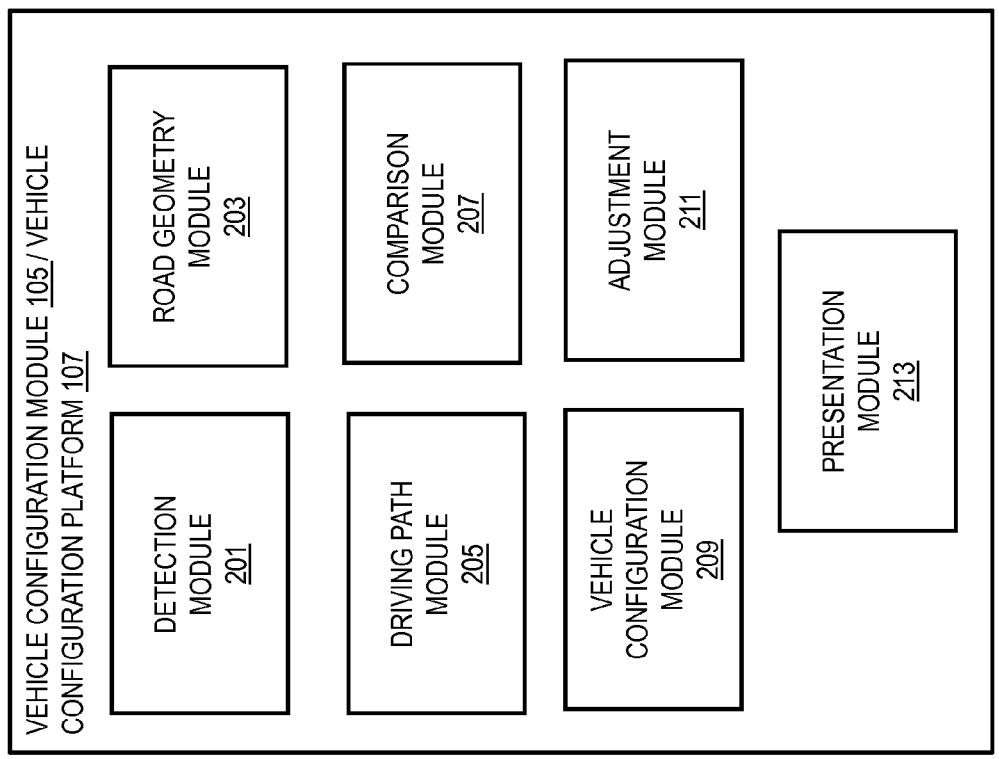
FIG. 2 is a diagram of the components of a vehicle configuration module/vehicle configuration platform, according to one embodiment.

FIG. 2 is a diagram of the components of a vehicle configuration module 105/vehicle configuration platform 107, according to one embodiment. By way of example, the vehicle configuration module 105/vehicle configuration platform 107 includes one or more components for determining differences between a geometry-based curvatures and experienced curvature. It is contemplated that the functions of these components may be combined in one or more components or performed by other components of equivalent functionality. In one embodiment, the vehicle configuration module 105/vehicle configuration platform 107 include a detection module 201, a road geometry module 203, a driving path module 205, a comparison module 207, a vehicle configuration module 209, an adjustment module 211, and a presentation module 213.

In one embodiment, the detection module 201 includes a system 100 integrated with vehicle sensors 111 and network databases 121 for correlating or comparing differences between a geometry-based curvature and experienced curvature. The mapping data can be preprogrammed into the vehicle system 100, gathered from crowd source data, or gathered from at least one vehicle sensors or devices, and processed via the road geometry module 203 and driving path module 205 to provide a mapping of differences from one or more travel segments. In addition, the system may be integrated with one or more advanced detection methods that employ sensors, such as motion sensors, location sensors, lasers, radar, sonar, infrared and other like techniques, to maximize the autonomous system's assessment of the contextual environment. This detection module 201 may be further modified with user preferences and tolerances, which, in part, provide a personalized driving configuration.

In one embodiment, the road geometry module 203 includes an integrated system for evaluating a path geometry based on one or more data sources. Such path geometries can be stored in an on-board systems related database, modified manually, accessed when prompted by an application 119, or gathered from vehicle devices or sensors incorporated into the detection module 201 and processed via the road geometry module 203 to provide geometry-based curvature with commensurate speed, acceleration, braking and other like characteristics. This geometry-based curvature may be further modified with user preferences and tolerances, which, in part, provide a personalized modification of the road geometry-based route.

In multiple embodiments, the driving path module 205 provides at least one experienced curvature for one or more travel segments. This experienced curvature reflects one or more users' actual driving paths and can include data from multiple sources including: other vehicles, crowd source data from one or more networks or databases, or data from one or more on-board vehicle sensors/detectors via the detection module 201 that is integrated with the processes of the driving path module 205. This driving path module 205 can be integrated with 3-D map data, communication networks, weather reports, and real-time information from other vehicles. This integration can provide a calculation for an experienced curvature, which is determined to be most efficient or safe by way of these system processes, network information sources, and/or advanced sensors.

In multiple embodiments, the comparison module 207 will process the outputted information of the road geometry module 203 and driving path module 205, respectively. The road geometry 203 and driving path modules 205 calculate a route using different methodologies, and each distinctly may not achieve the best driving result in terms of an optimized balance of comfort, efficiency, and/or safety. Therefore, the vehicle configuration platform 107 includes a comparison module 207 to evaluate the road geometry 203 and driving path 205 modules and compare the magnitude of the difference between the two using the inputted data, algorithms, and process formats to calculate relevant difference information corresponding to one or more travel segments. This difference data can be outputted to the vehicle configuration module 209 to provide an assessment of potential problem areas that may necessitate a user choice of one of the road paths or activation of manual control.

In multiple embodiments, the vehicle configuration module 209 determines one or more differences between a geometry-based curvature and experienced curvature based on the comparison module 207, which evaluates the road geometry 203 and driving path modules 205, respectively. This module may make a determination of potential problem areas and make a confidence assessment. To make this assessment, numerous inputs may be applicable including network data, sensor inputs, personal preferences, or real-time data and other like inputs. Furthermore, the vehicle configuration module 209 can incorporate feedback information via the adjustment module 211.

In multiple embodiments, the adjustment module 211 evaluates feedback information to provide adjustments for the vehicle configuration module 209 that results in an adjustment or updating of the one or more differences between a geometry-based curvature and experienced curvature. This feedback might include user inputs through an application 119 using an interface such as to specify a particular experience curvature based on the aforementioned cluster data. Or, the adjust module 211 may provide feedback to the vehicle configuration module 209 by including data related to updated or real-time road geometry, driving path information, or occupant input data. Such information may be presented and interfaced to the at least one occupant via the presentation module 213.

Figure 3:
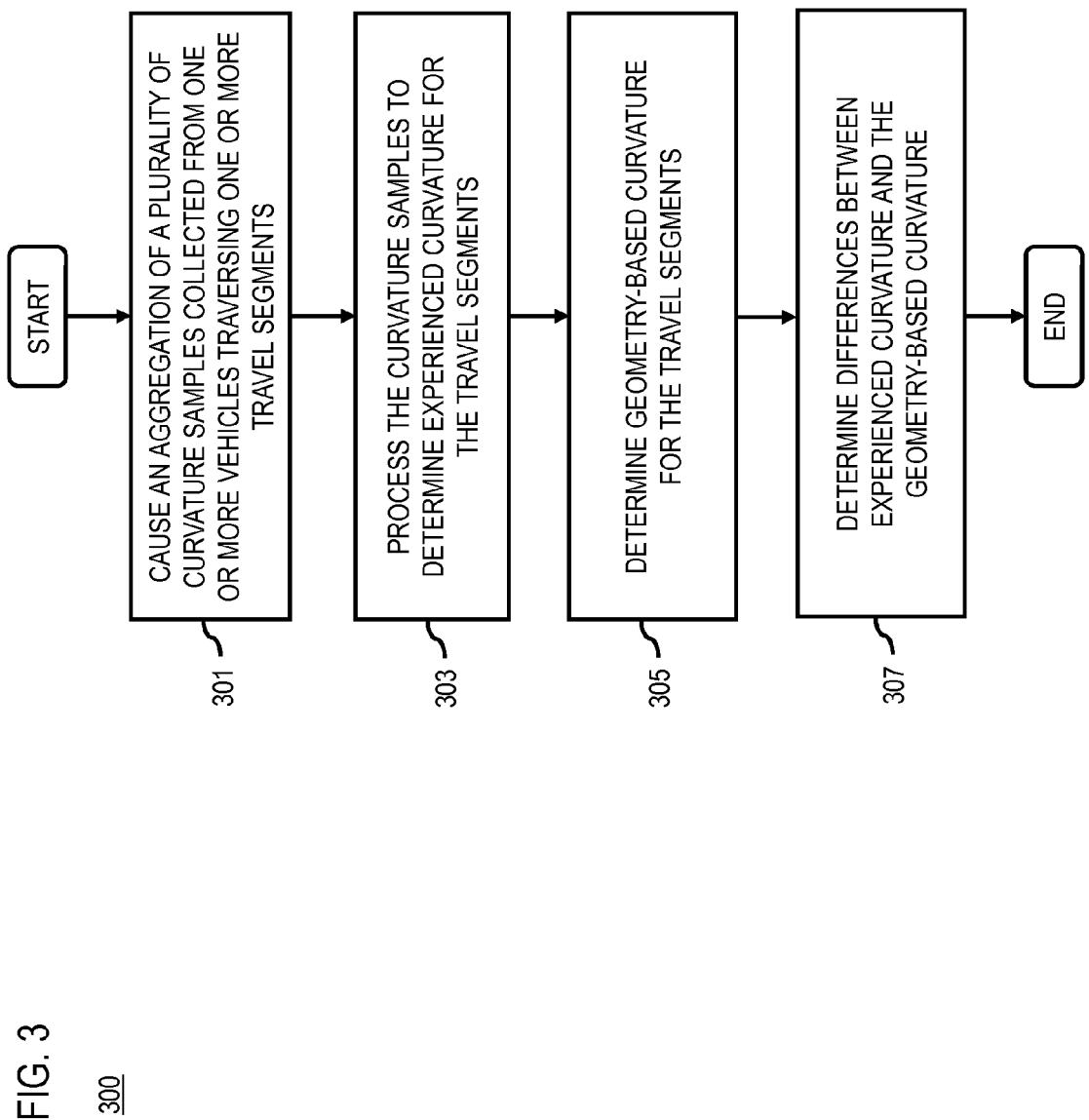
FIG. 3 is a flowchart of a process to determine the differences between the experienced curvature and geometry based curvature, according to one embodiment.
Figure 14:
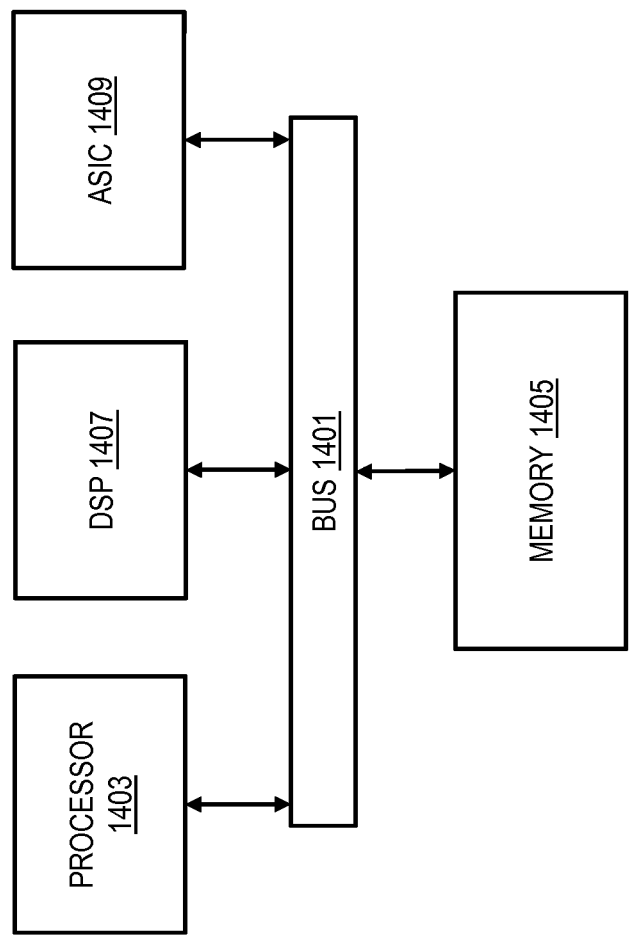
FIG. 14 is a diagram of a chip set that can be used to implement an embodiment of the invention.

FIG. 3 is a flowchart of a process for determining one or more differences between at least one experienced curvature and the at least one geometry-based curvature, according to one embodiment. In one embodiment, the experienced curvature is determined by assessing an aggregation of a plurality of curvature samples collected from one or more vehicles traversing one or more travel segments in order to estimate a more natural and user preferred route, according to one embodiment. Furthermore, the experienced curvature is subsequently compared with the geometry-based curvature to determine the differences for one or more travel segments. In one embodiment, the vehicle configuration platform 107 performs the process 300 and is implemented in, for instance, a chip set including a processor and a memory as shown in FIG. 14. In addition or alternatively, the vehicle configuration module 105 can perform all or a portion of the process 300.

In step 301, the driving path module 205 may cause an aggregation of a plurality of curvature samples collected from one or more vehicles traversing one or more travel segments. The aggregated curvatures are taken from crowd source data or other driving path data sets and can be evaluated using a variety of techniques using on-board computer algorithms or network systems.

In step 303, the vehicle configuration platform 107 may process the curvature samples to determine an experienced curvature for the travel segments for at least one vehicle. These samples could be evaluated from one or more sources including on-board systems, networks, or vehicle sensor data. In one embodiment, an experienced curvature may be calibrated using one or more of a number of techniques including averaging the aggregated curvatures or grouping curvature datasets into clusters based on relative frequencies and then determining the experienced curvature using selection algorithms or other like process inputs. In another scenario, these factors may be assessed in conjunction with vehicle sensor systems, real-time data, and/or other like techniques.

In step 305, the vehicle configuration platform 107 may determine a geometry-based curvature for travel segments in accordance with curvatures such as road arc length derived from mapping data including on-board map data and/or map data from a network. In one embodiment, these capabilities can be determined by accessing road geometry or by taking into account speed and acceleration characteristics in conjunction with map data, communication networks, weather reports, real-time information from other vehicles, advanced sensor systems, or a combination thereof.

In step 307, the vehicle configuration platform 107 may determine differences between experienced curvature and the geometry-based curvature. In one embodiment, the differences can determine areas of uncertainty in which the experienced curvature and geometry-based curvature follow different paths. Such areas may include free-form travel areas, lane change areas, merge areas, object avoidance areas, or areas of error of the geometry-based curvature and/or experienced curvature. Furthermore, each of the differences for the travel segments can be weighted and/or grouped into clusters with each cluster processed as to its relative reliability. The travel segment cluster data may also include a steering behavior, an acceleration behavior, a braking behavior, or a combination thereof of the one or more vehicles. In one embodiment, the differences or clusters of differences could be given a relative confidence of reliability. This confidence can be determined based on a difference threshold value, which assigns high confidence to similar geometry-based and experienced curvatures and low confidence to disparate road curvatures when the difference value is greater than the aforementioned threshold.

Figure 4:
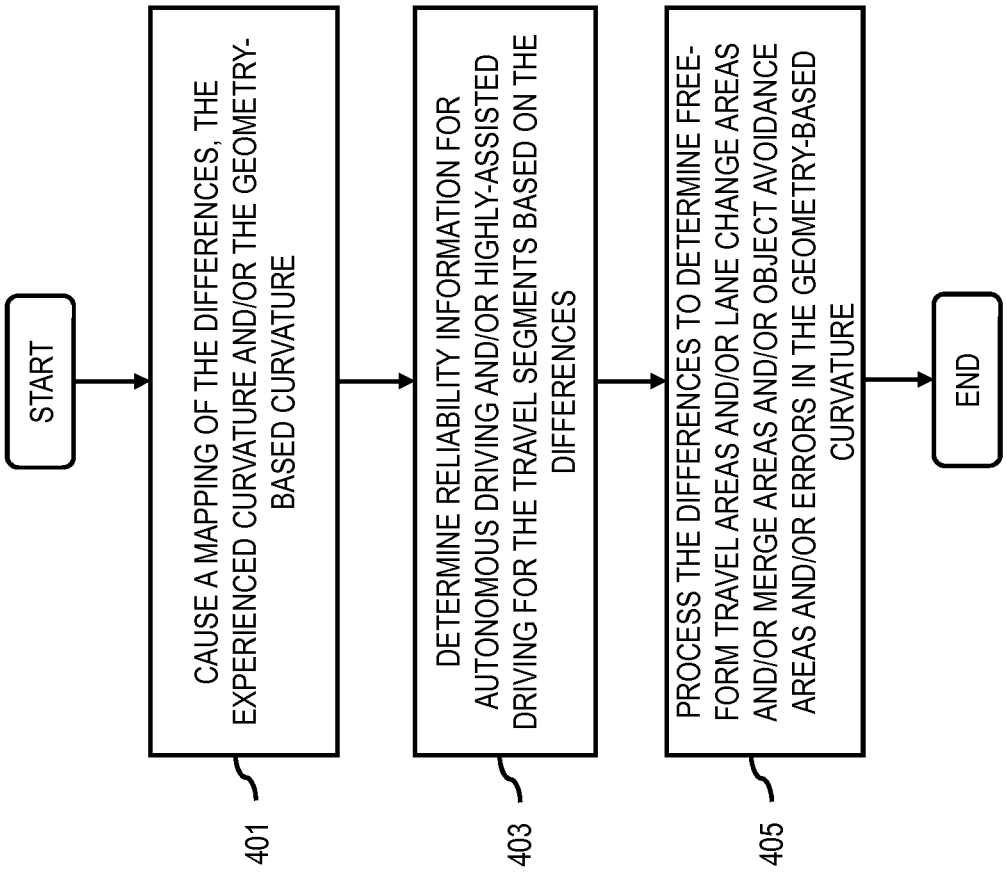
FIG. 4 is a flowchart of a process to process the differences to determine areas of low reliability, according to one embodiment.

FIG. 4 is a flow chart of a process to process the differences to determine areas of low reliability, according to one embodiment. In one embodiment, the vehicle configuration platform 107 performs the process 400 and is implemented in, for instance, a chip set including a processor and a memory as shown in FIG. 14. In addition or alternatively, the vehicle configuration module 105 can perform all or a portion of the process 400.

In step 401, the vehicle configuration platform 107 may cause a mapping of the differences, the experienced curvature, the geometry-based curvature, or a combination thereof. In one embodiment, the differences for given travel segments are assessed as potential problem areas in which the vehicle may have to make a selection based on a program, network, or user input. In one scenario, the travel segments may be classified based on the potential problem, such as for lane change areas, construction areas, obstacle avoidance areas, or other like situations. In one embodiment, the vehicle configuration platform 107 and/or user may use this mapping to select the geometry-based, experienced based curvature, a cluster of experienced curvatures, or manual control depending on the magnitude of the difference and the particular type of travel segment encountered.

In step 403, the vehicle configuration platform 107 may determine reliability information for autonomous driving, highly-assisted driving, or a combination thereof for the travel segments based on the differences. In one embodiment, the vehicle configuration platform 107 performs a determination of the differences between curvatures and assigns a reliability based on the magnitude of the differences including whether the difference is above a predetermined threshold. In one scenario, a relative reliability may be assigned including such designations as high, moderate, variable, low, or unstable. In one embodiment, the magnitude and nature of the differences may be assessed conjointly to determine a type of travel segment including merge areas, construction areas, and other like areas.

In step 405, the vehicle configuration platform 107 may process the differences to determine free-form travel areas, lane change areas, merge areas, object avoidance areas, errors in the geometry-based curvature, or a combination thereof. In one embodiment, the vehicle configuration platform 107 can process the differences in the curvatures to determine potential problem areas. In one scenario, the curvature differences may be assessed in concert with a program to determine the nature of the problem area and what course would be preferred by at least one user. In another scenario, the user may select from one or more viable routes. This may be performed using an on-board interactive display as shown in FIG. 12 via the presentation module 213, which can incorporate user data into the system 100 using selection algorithms. In another scenario, the at least one user may opt for manual control for low reliability areas in which the autonomous vehicle may compromise performance or safety. Thus, this process 400 can be used to process the differences via the vehicle configuration platform 107 to determine problem areas or systemic errors in order to maintain a real-time analysis of the at least one vehicle route information.

Figure 5:
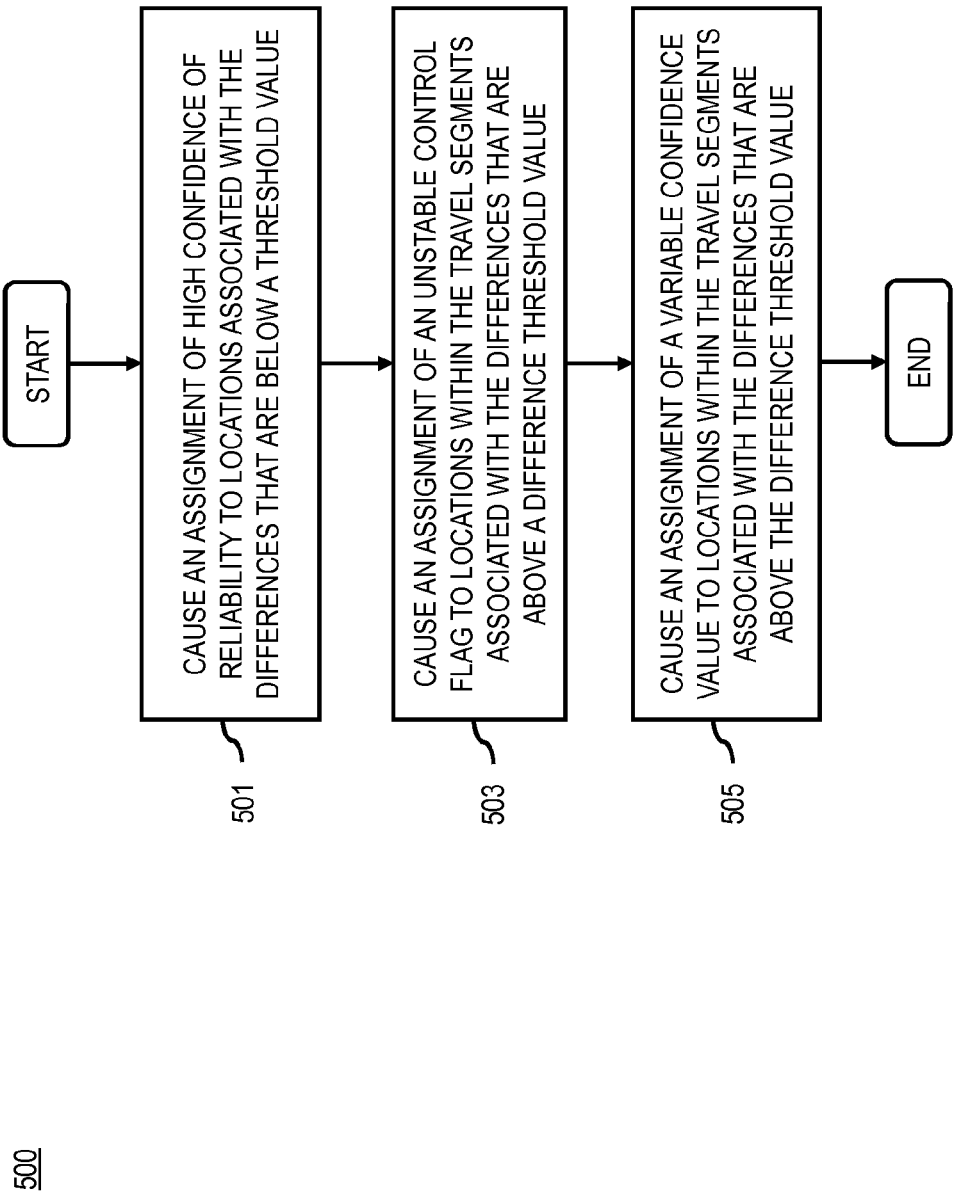
FIG. 5 is a flowchart of a process to cause an assignment of confidence values to areas associated with differences above the difference threshold value, according to one embodiment.

FIG. 5 is a flowchart of process to cause an assignment of confidence values to areas associated with differences above the difference threshold value, according to one embodiment. In one embodiment, the vehicle configuration platform 107 performs the process 500 and is implemented in, for instance, a chip set including a processor and a memory as shown in FIG. 14. In addition or alternatively, the vehicle configuration module 105 can perform all or a portion of the process 500.

In step 501, the vehicle configuration platform 107 may cause an assignment of high confidence of reliability to locations associated with the differences that are below a threshold value. In one embodiment, the geometry-based curvature and experienced curvature are compared using on-board computers or analysis from a network. In one scenario, the vehicle configuration platform 107 may determine the differences are below a threshold value and thereby considered reliable enough to be excluded from a mapping of differences.

In step 503, the vehicle configuration platform 107 may cause an assignment of an unstable control flag to locations within the travel segments associated with the differences that are above a difference threshold value. In one embodiment, the vehicle configuration platform 107 can map the differences above the threshold value based on the magnitude and nature of the information, and subsequently make a determination to assign an unstable control flag to low reliability travel segments. As with several other embodiments, this determination depends on a variety of factors including preprogrammed inputs, real-time information, and/or user inputs.

In step 505, the vehicle configuration platform 107 may cause an assignment of a variable confidence value to locations within the travel segments associated with the differences that are above the difference threshold value. In one embodiment, the vehicle configuration platform 107 provides an assessment of variable confidence if the difference is greater than a threshold value but lower than a high confidence value. In one embodiment, for moderate differences and/or determinations, the system may assign variable steer confidence based on the difference between the two values, store the actual difference so the user can access one of the determined curvatures, indicate a driving pattern from given clusters of curvatures, or other like options.

Figure 6:
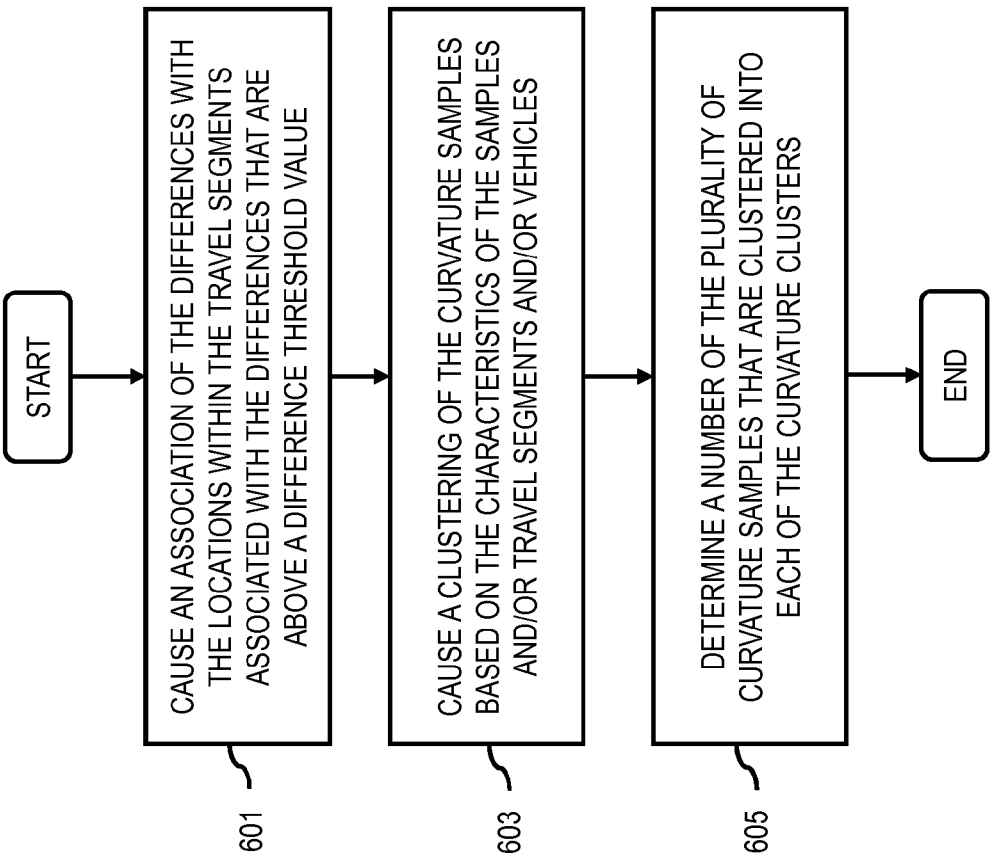
FIG. 6 is a flowchart of a process to determine a number of the plurality of curvature samples that are clustered into each of the curvature clusters, according to one embodiment.

FIG. 6 is a flowchart for a process to determine a number of the plurality of curvature samples that are clustered into each of the curvature clusters, according to one embodiment. In one embodiment, the vehicle configuration platform 107 performs the process 600 and is implemented in, for instance, a chip set including a processor and a memory as shown in FIG. 14. In addition or alternatively, the vehicle configuration module 105 can perform all or a portion of the process 600.

In step 601, the vehicle configuration platform 107 may cause an association of the differences with the locations within the travel segments associated with the differences that are above a difference threshold value. As in multiple embodiments, the vehicle configuration platform 107 may determine differences between a geometry-based curvature and experienced curvature and furthermore determine whether the differences are above a threshold value. In multiple scenarios, the differences above the threshold value may be assigned a confidence level, classified according to the nature of the travel segment, and/or integrated into system 100 updates to select one or more curvatures or manual control.

In step 603, the vehicle configuration platform 107 may cause for sample differences above the threshold value, a clustering of the curvature samples based on the characteristics of the samples, travel segments, vehicles, a steering behavior, an acceleration behavior, a braking behavior, or a combination thereof of the one or more vehicles. In one embodiment, the sample differences may be classified into such categories as merge lanes, on-ramp exits, free-form turn areas, areas of possible error, and other like scenarios. In another embodiment, the curvature samples may be clustered based on relative frequencies and/or related characteristics.

In step 605, the vehicle configuration platform 107 may determine a number of the plurality of curvature samples that are clustered into each of the curvature clusters, according to one embodiment. In at least one embodiment, curvature samples can be segregated based on relative frequencies and/or characteristics including route, steering behavior, acceleration behavior, braking behavior, or a combination thereof of the one or more vehicles. In one scenario, the system 100 may determine the preferred path based on multiple sources including preprogrammed or real-time selective algorithms, network information, and/or choices by the user via the presentation module 213.

Figure 7:
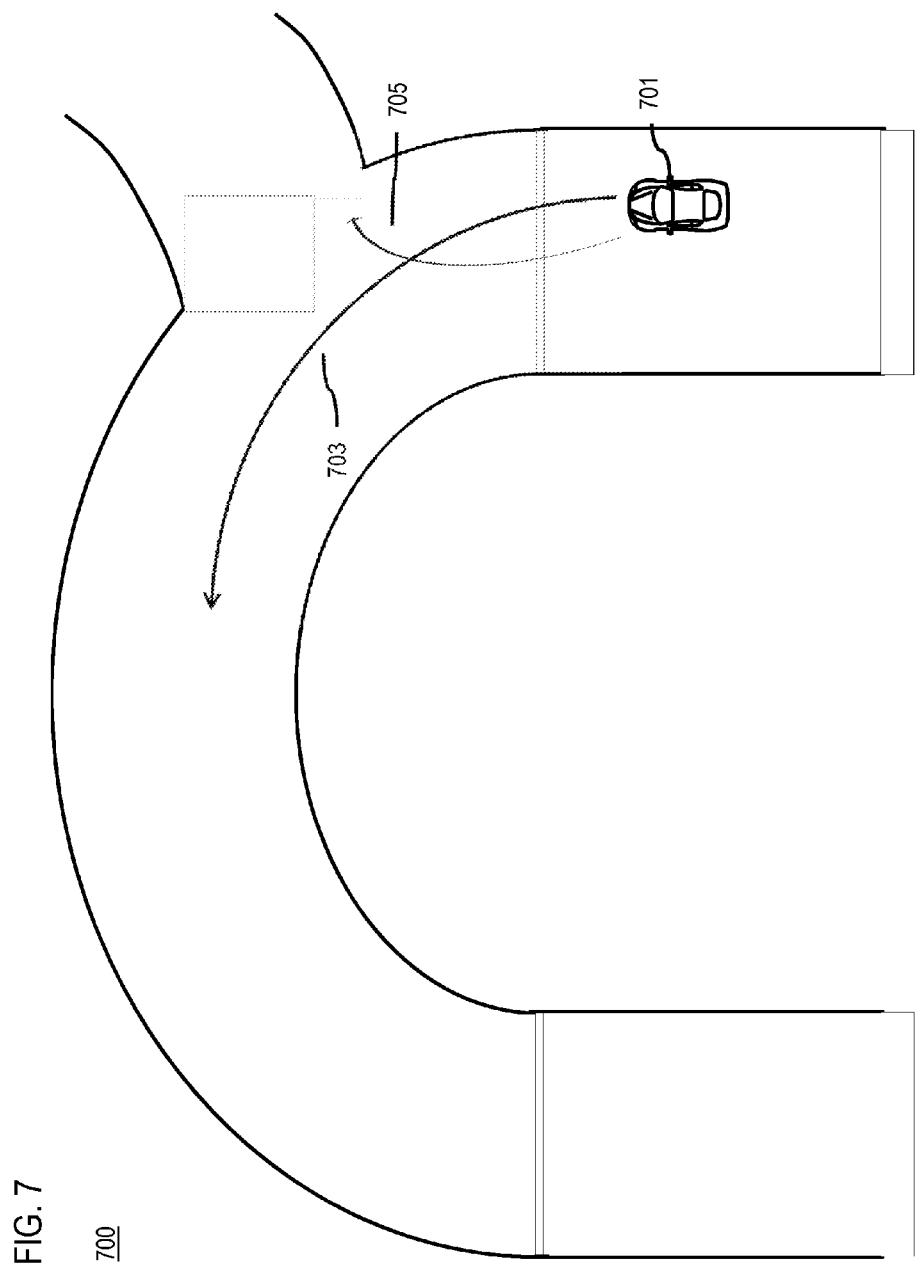
FIG. 7 is a diagram of path adjustment based on vehicle route, according to one embodiment.

FIG. 7 is an illustration of a vehicle 701 which could follow either a geometry-based curvature 703 or an experienced curvature 705 when exiting using an off-ramp, according to one embodiment. In one embodiment, the figure shows how the same travel segment could have multiple driving path configurations based on the travel route of the at least one user. These two travel segments can be processed via the comparison module 207 to provide a viable choice of route via the vehicle configuration module 105 of FIG. 2.

Figure 8A:
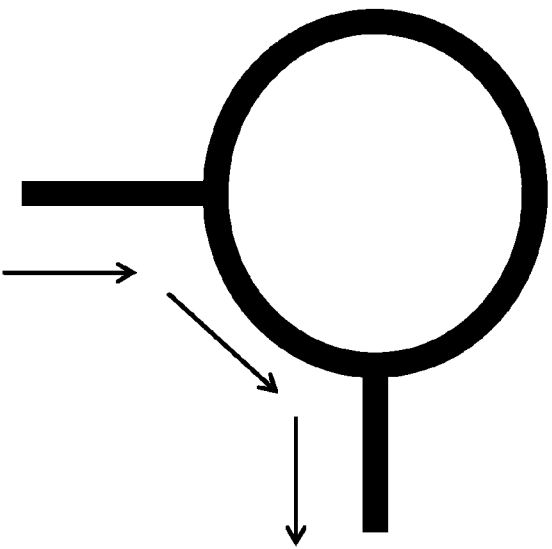
FIG. 8A is a diagram of a vehicle route about a roundabout road segment, according to one embodiment.
Figure 8B:
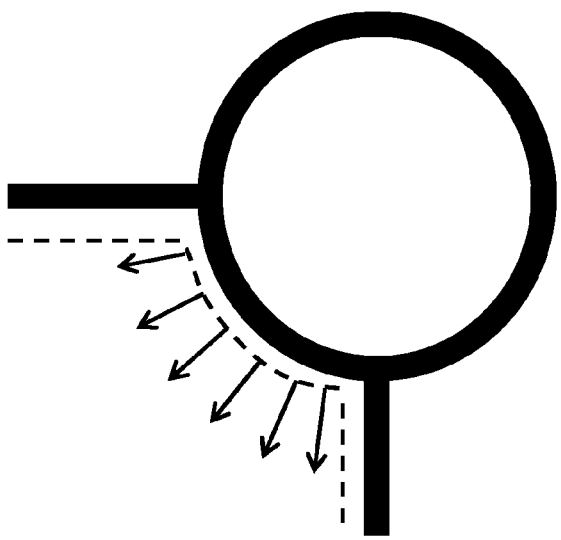
FIG. 8B is a diagram of a vehicle route about a roundabout road segment for a geometry-based curvature, according to one embodiment.
Figure 8C:
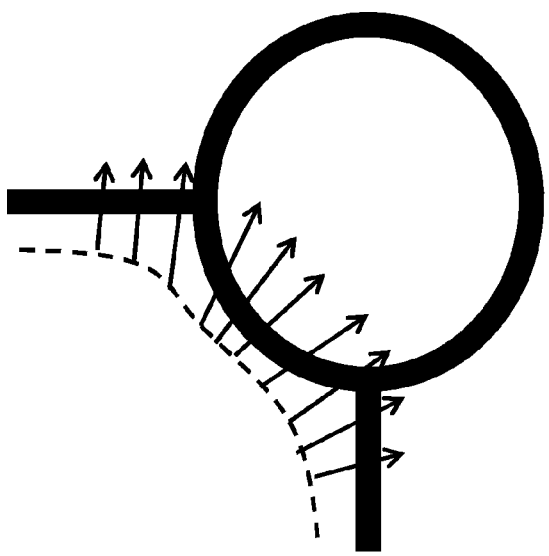
FIG. 8C is a diagram of an aggregated vehicle route including sensor data and/or crowd sourced data about a roundabout for an expected curvature, according to one embodiment.

FIGS. 8A-8C are illustrations of possible travel routes about a roundabout (FIG. 8A), which could follow either a geometry-based curvature (FIG. 8B) or an experienced curvature (FIG. 8C), according to one embodiment. In one scenario, the routes of the geometry-based (FIG. 8B) and the experienced based (FIG. 8C) curvatures are considerably different and almost mirror one another. This illustrates the drastic difference between a route that follows the road and a more natural route that most drivers would usually follow. Thus the road geometry of a roundabout does not reflect the typical curvature experienced by a vehicle that traverses only a portion for the roundabout. The vehicle, in fact, never follows the arc of the roundabout 'circle' and the real curvature is approximately the opposite.

Figure 9:
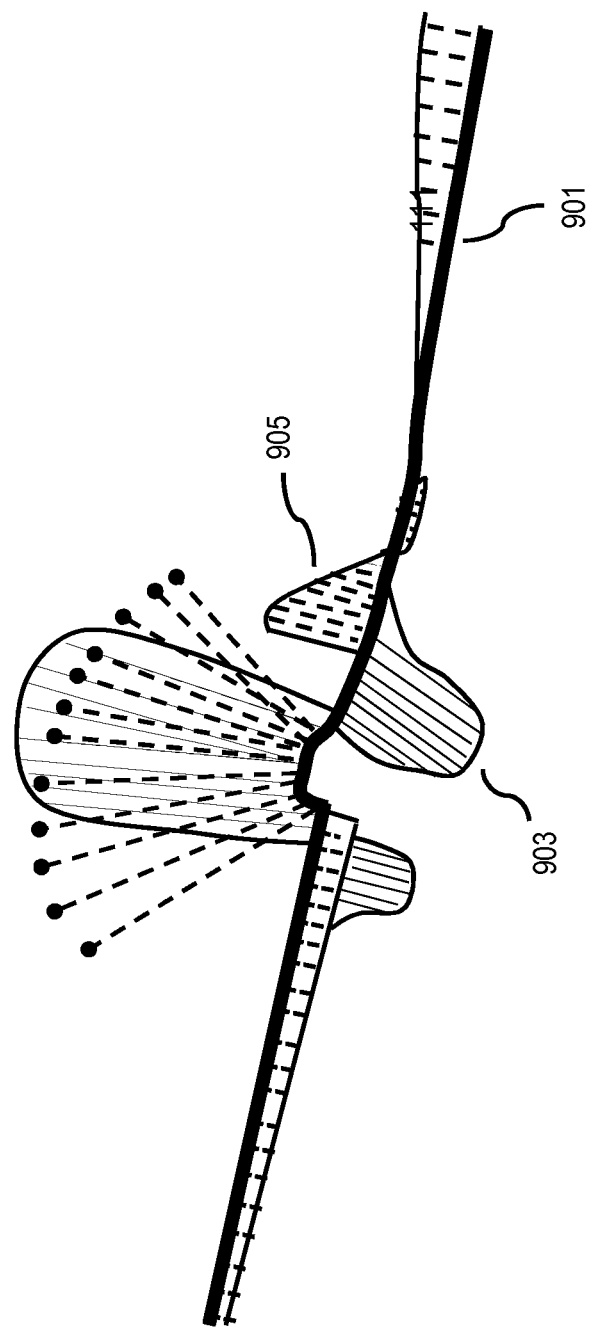
FIG. 9 is a diagram of a geometry-based curvature and experienced curvature along a route with the curvature indicated by the length of the dashed and solid lines, respectively, according to one embodiment.
Figure 10:
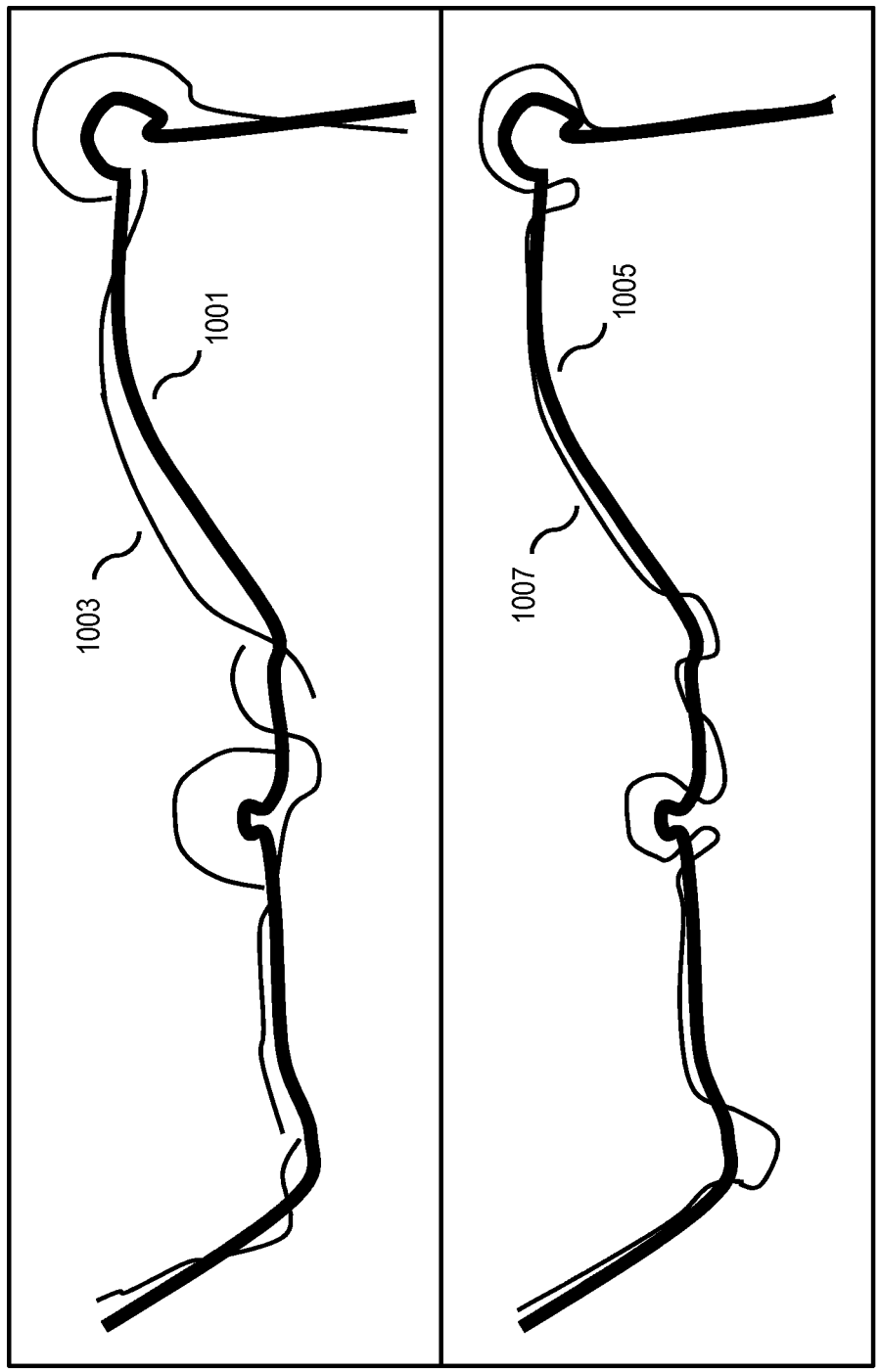
FIG. 10A is a diagram of an geometry based curvature along a route, according to one embodiment.
FIG. 10B is a diagram of an experienced curvature along a route, according to one embodiment.

FIG. 9 is a diagram of a geometry-based curvature [905] and experienced curvature [903] along a route [901] with the curvature indicated by the length of the dashed and solid lines, respectively. The road is illustrated by the thick black line [901] and the relative curvatures are illustrated by the relative heights of the lines. This computer generated map of two possible vehicle curvatures illustrates a real-world example of a vehicle deviating from an ideal travel route geometry FIGS. 10A-10B are diagrams of a geometry-based curvature [1003] and an experienced curvature [1007], respectively, along a travel route [1001, 1005] with the curvature indicated by the distance of the thin solid line from the travel route [1001, 1005] represented by the thick black line. The predicted geometry-based curvature [1003] for the path is different than the experienced curvature [1007] especially for the roundabout in the middle of the diagram. The geometry of the roundabout is nearly a perfect circle, which would imply a constant curvature. In reality, the experienced curvature is quite different that the geometry predicted values, especially when traversing through the roundabout. Also, note that the geometry-based predicted curvature [1003] may be discontinuous due to traversing intersections.

Figure 11:
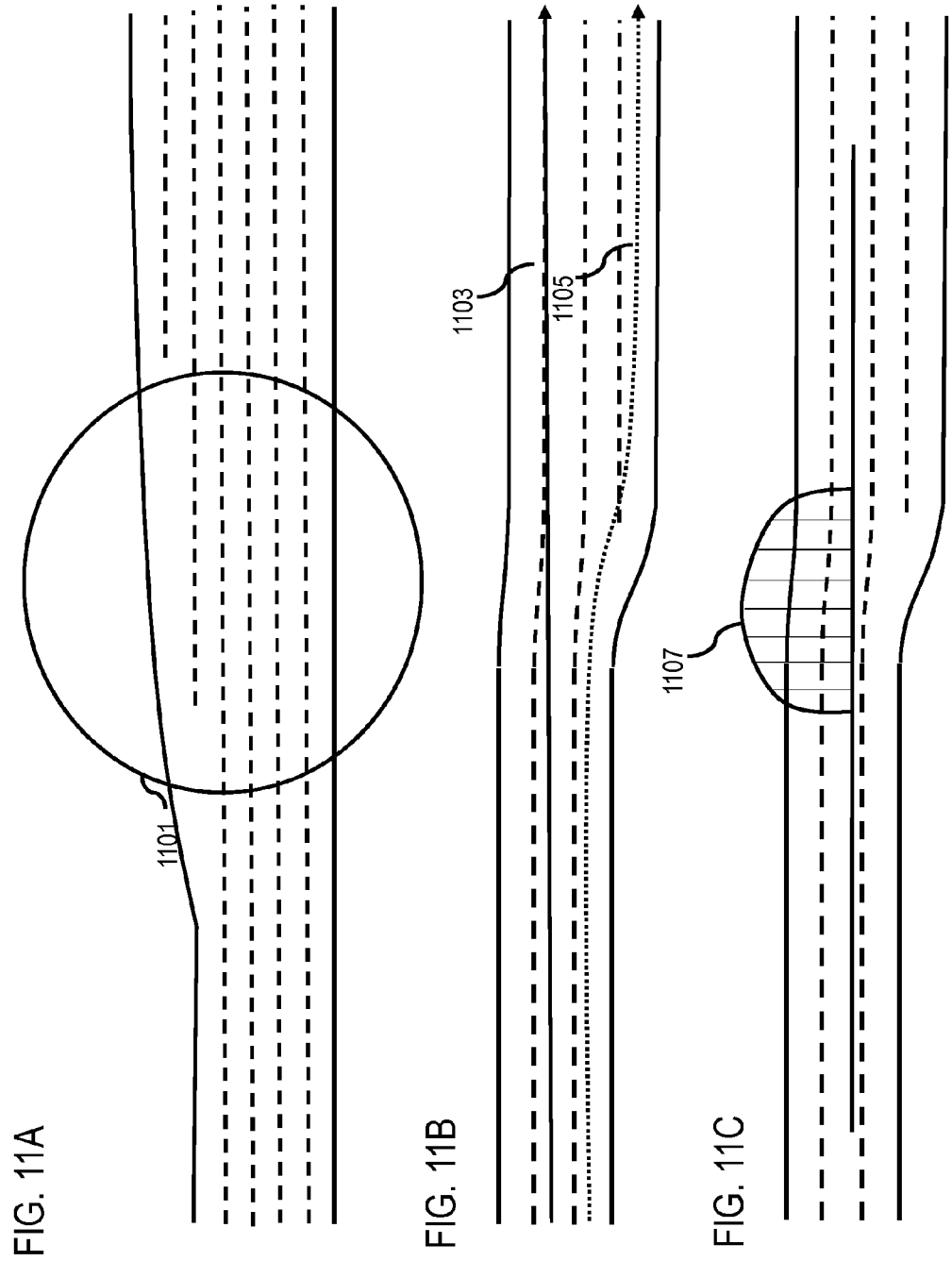
FIG. 11A is a diagram showing an area of road in which an aggregated curvature indicates that many vehicles change path, according to one embodiment.
FIG. 11B is a diagram of a segment of road in which geometry curvature indicates a straight path yet the actual road has a bend, according to one embodiment.
FIG. 11C is a diagram of an experienced curvature along a route indicated by the vertical lines with the aggregate curvature of crowd sourced vehicles indicating that vehicles perform steering at this location even though the geometry indicates no steering, according to one embodiment.

FIG. 11A is a diagram showing an area of road [1101] in which an aggregation of curvature samples may indicate that many vehicles change path, according to one embodiment.

FIG. 11B is a diagram of an segment of road in which geometry curvature indicates a straight path [1103] yet the actual road has a bend, which is reflected by the experienced curvature [1105], according to one embodiment.

FIG. 11C is a diagram of an experienced curvature along a route with the curvature indicated by the vertical lines [1107]. At the location, an aggregation of curvatures of crowd sourced vehicles indicates that vehicles perform steering at this location, even though the geometry indicates no steering, according to one embodiment.

FIG. 12 is a user interface diagram that represents the selection of manual control in a potential problem area according to on-board selection menus, according to one embodiment. In one scenario, the user interface diagram includes an on-board vehicle assessment [901] for determining travel segments of uncertain terrain according to the difference information calculated according to multiple embodiments, which may be followed using selection menus [903, 905], according to one embodiment.

The processes described herein for determining one or more differences between at least one experienced curvature and the at least one geometry-based curvature may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
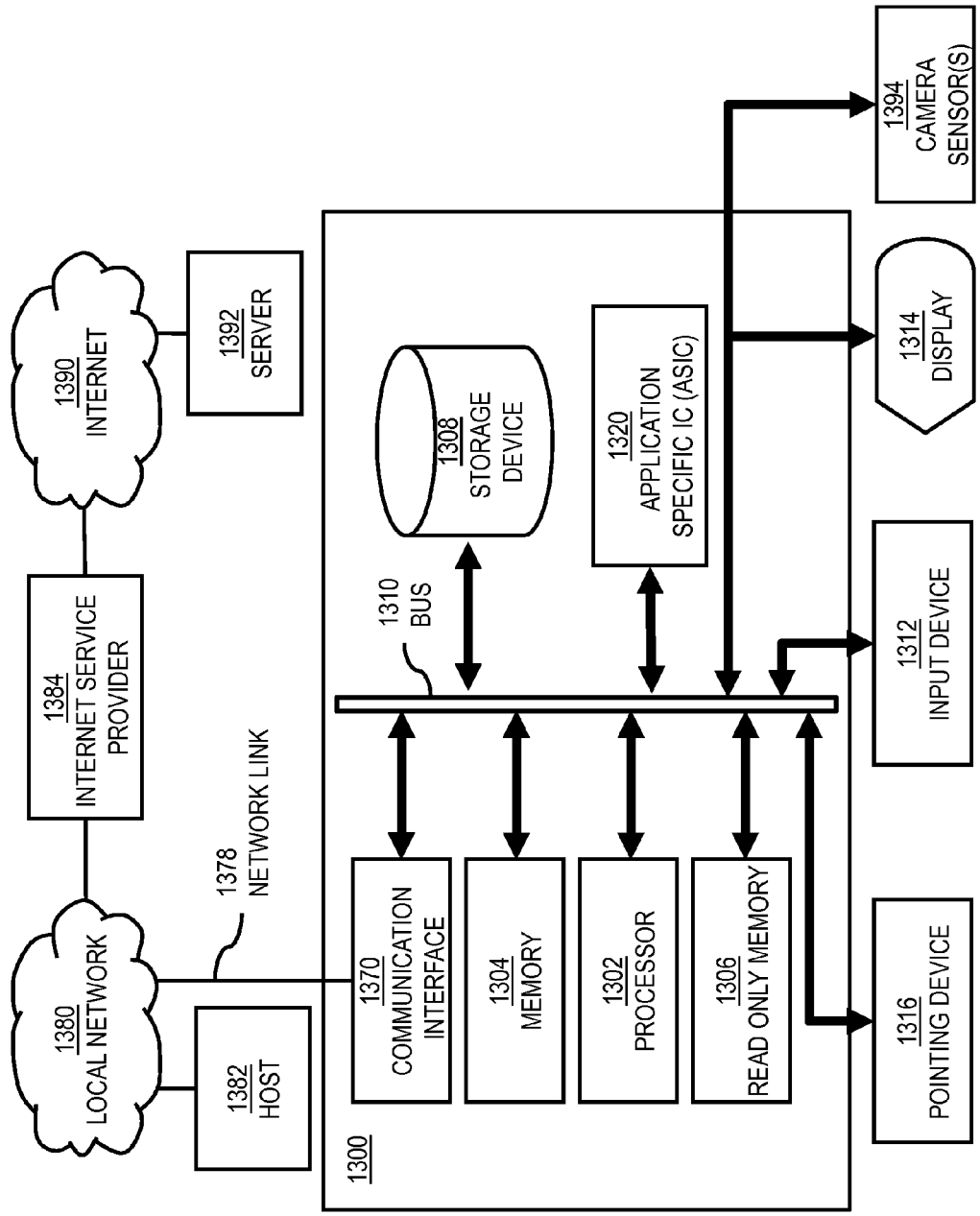
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to determine one or more differences between at least one experienced curvature and the at least one geometry-based curvature as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of determining one or more differences between at least one experienced curvature and the at least one geometry-based curvature.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to determine one or more differences between at least one experienced curvature and the at least one geometry-based curvature. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or any other dynamic storage device, stores information including processor instructions for determining one or more differences between at least one experienced curvature and the at least one geometry-based curvature. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for determining one or more differences between at least one experienced curvature and the at least one geometry-based curvature, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314, and one or more camera sensors 1394 for capturing, recording and causing to store one or more still and/or moving images (e.g., videos, movies, etc.) which also may comprise audio recordings. In some embodiments, for example, in embodiments in which the computer system 1300 performs all functions automatically without human input, one or more of external input device 1312, display device 1314 and pointing device 1316 may be omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 109 for determining one or more differences between an experienced curvature and a geometry-based curvature to the UE 101.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to determine one or more differences between an experienced curvature and a geometry-based curvature as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of determining one or more differences between an experienced curvature and a geometry-based curvature.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to determine one or more differences between an experienced curvature and a geometry-based curvature. The memory 1405 also stores the data associated with or generated by the execution of the inventive steps.

Figure 15:
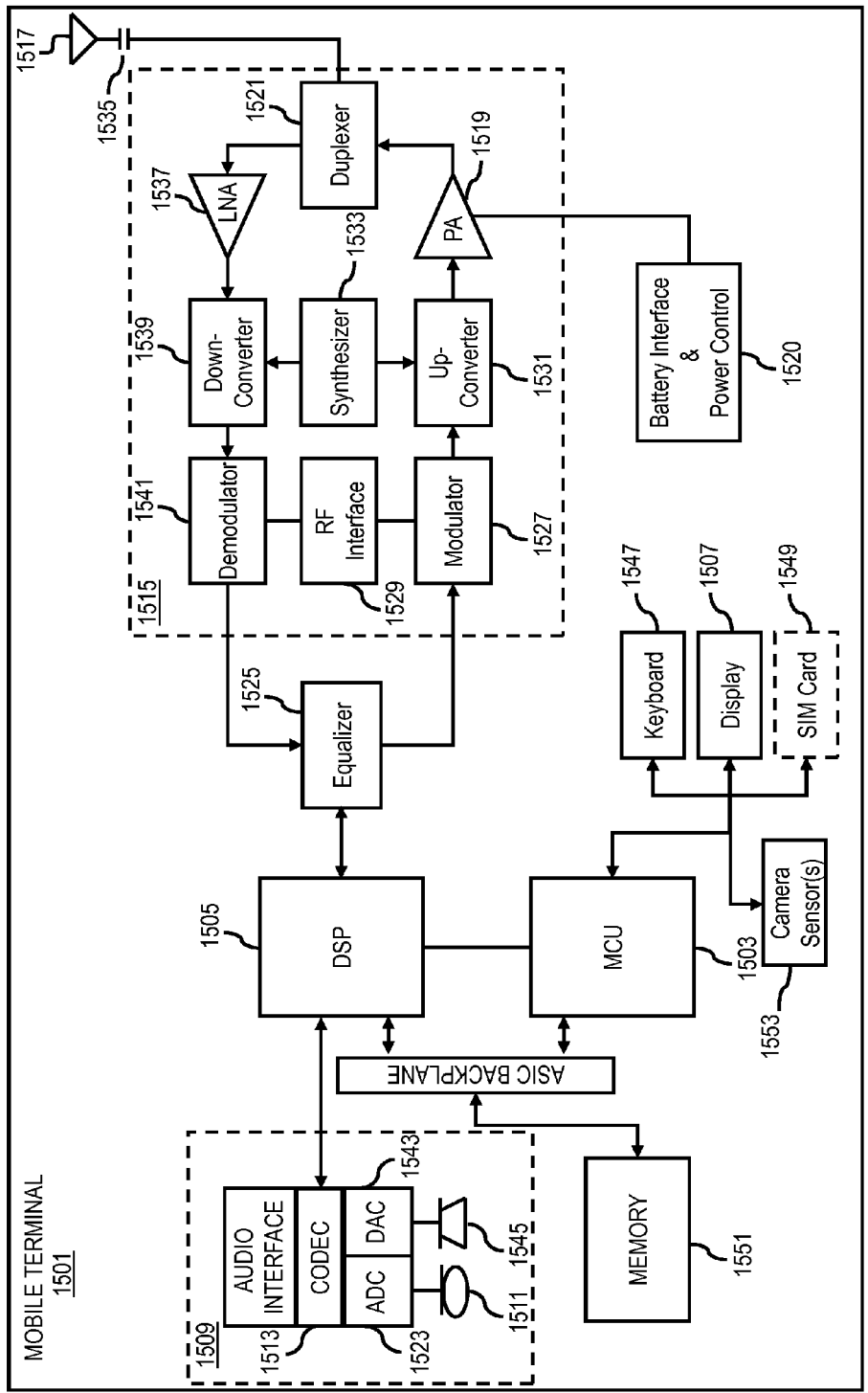
FIG. 15 is a diagram of a mobile terminal (e.g., handset) that can be used to implement an embodiment of the invention.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of determining one or more differences between an experienced curvature and a geometry-based curvature. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of determining one or more differences between an experienced curvature and a geometry-based curvature. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile terminal 1501 to determine one or more differences between an experienced curvature and a geometry-based curvature. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

Further, one or more camera sensors 1553 may be incorporated onto the mobile station 1501 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for generating geometrical map data that includes road curvature data for operating an autonomous vehicle comprising:
   collecting, by respective sensors of one or more vehicles, a plurality of curvature samples when the one or more vehicles traverses one or more travel segments;
   processing the curvature samples to determine at least one experienced curvature for the one or more travel segments, the at least one experienced curvature indicating respective driving paths of the one or more vehicles through the one or more travel segments;
   determining at least one geometry-based curvature for the one or more travel segments, the at least one geometry-based curvature calculated based on road geometry data associated with the one or more travel segments;
   determining one or more differences between at least one experienced curvature and the at least one geometry-based curvature to associate the one or more differences to the one or more travel segments in the geometrical map data; and
   initiating or recommending a manual operation of the autonomous vehicle based on the geometrical map data including the one or more differences when the autonomous vehicle traverses the one or more travel segments.

2. The method of claim 1, further comprising:
   mapping the one or more differences, the at least one experienced curvature, the at least one geometry-based curvature, or a combination thereof associated with respect to the one or more travel segments.

3. The method of claim 1, further comprising:
   determining reliability information for autonomous driving, highly-assisted driving, or a combination thereof for the one or more travel segments based, at least in part, on the one or more differences.

4. The method of claim 1, further comprising:
   processing the one or more differences to determine one or more free-form travel areas, one or more lane change areas, one or more merge areas, one or more object avoidance areas, one or more errors in the at least one geometry-based curvature, or a combination thereof.

5. The method of claim 1, further comprising:
   assigning a high confidence of reliability to one or more locations of the one or more travel segments associated with the one or more differences that are below at least one difference threshold value.

6. The method of claim 1, further comprising:
   assigning an unstable control flag to the one or more locations within the one or more travel segments associated with the one or more differences that are above at least one difference threshold value.

7. The method of claim 1, further comprising:
   assigning a variable confidence value to the one or more locations within the one or more travel segments associated with the one or more differences that are above at least one difference threshold value, wherein the variable confidence value is based, at least in part, on a magnitude of the one or more differences.

8. The method of claim 1, further comprising:
associating the one or more differences with the one or more locations within the one or more travel segments associated when the one or more differences are above at least one difference threshold value.

9. The method of claim 1, wherein the one or more differences are above at least one difference threshold value, the method further comprising:
clustering the plurality of curvature samples into one or more curvature clusters based, at least in part, on one or more characteristics of the plurality of curvature samples, the one or more travel segments, the one or more vehicles, or a combination thereof,
wherein the one or more characteristics include, at least in part, a type of curvature; and
wherein the type of curvature includes, at least in part, a straight line, a slight turn, an extreme turn, or a combination thereof.

10. The method of claim 8, further comprising:
determining a number of the plurality of curvature samples that are clustered into each of the one or more curvature clusters.

11. An apparatus for generating geometrical map data that includes road curvature data for operating an autonomous vehicle comprising:
at least one processor; and
at least one memory including computer program code for one or more programs,
the at least one memory and the computer program code configured to, with the at least one processor, cause the apparatus to perform at least the following;
collect, by respective sensors of one or more vehicles, a plurality of curvature samples when the one or more vehicles traverses one or more travel segments;
process the curvature samples to determine at least one experienced curvature for the one or more travel segments, the at least one experienced curvature indicating respective driving paths of the one or more vehicles through the one or more travel segments;
determine at least one geometry-based curvature for the one or more travel segments, the at least one geometry-based curvature calculated based on road geometry data associated with the one or more travel segments;
determine one or more differences between at least one experienced curvature and the at least one geometry-based curvature to associate the one or more differences to the one or more travel segments in the geometrical map data; and
initiate or recommend a manual operation of the autonomous vehicle based on the geometrical map data including the one or more differences when the autonomous vehicle traverses the one or more travel segments.

12. The apparatus of claim 11, wherein the apparatus is further caused to:
map the one or more differences, the at least one experienced curvature, the at least one geometry-based curvature, or a combination thereof associated with respect to the one or more travel segments.

13. The apparatus of claim 11, wherein the apparatus is further caused to:
determine reliability information for autonomous driving, highly-assisted driving, or a combination thereof for the one or more travel segments based, at least in part, on the one or more differences.

14. The apparatus of claim 11, wherein the apparatus is further caused to:
process the one or more differences to determine one or more free-form travel areas, one or more lane change areas, one or more merge areas, one or more object avoidance areas, one or more errors in the at least one geometry-based curvature, or a combination thereof.

15. The apparatus of claim 11, wherein the apparatus is further caused to:
assign a high confidence of reliability to one or more locations of the one or more travel segments associated with the one or more differences that are below at least one difference threshold value.

16. The apparatus of claim 11, further comprising:
assign an unstable control flag to the one or more locations within the one or more travel segments associated with the one or more differences that are above at least one difference threshold value.

17. The apparatus of claim 11, further comprising:
assign a variable confidence value to the one or more locations within the one or more travel segments associated with the one or more differences that are above at least one difference threshold value,
wherein the variable confidence value is based, at least in part, on a magnitude of the one or more differences.

18. A non-transitory computer-readable storage medium for generating geometrical map data that includes road curvature data for operating an autonomous vehicle, carrying one or more sequences of one or more instructions which, when executed by one or more processors, cause an apparatus to perform:
collect, by respective sensors of one or more vehicles, a plurality of curvature samples when the one or more vehicles traverses one or more travel segments;
process the curvature samples to determine at least one experienced curvature for the one or more travel segments, the at least one experienced curvature indicating respective driving paths of the one or more vehicles through the one or more travel segments;
determine at least one geometry-based curvature for the one or more travel segments, the at least one geometry-based curvature calculated based on road geometry data associated with the one or more travel segments;
determine one or more differences between at least one experienced curvature and the at least one geometry-based curvature to associate the one or more differences to the one or more travel segments in the geometrical map data; and
initiate or recommend a manual operation of the autonomous vehicle based on the geometrical map data including the one or more differences when the autonomous vehicle traverses the one or more travel segments.

19. The non-transitory computer-readable storage medium of claim 18, wherein the apparatus is further caused to perform:
map the one or more differences, the at least one experienced curvature, the at least one geometry-based curvature, or a combination thereof associated with respect to the one or more travel segments.

20. The non-transitory computer-readable storage medium of claim 18, wherein the apparatus is further caused to perform:
determine reliability information for autonomous driving, highly-assisted driving, or a combination thereof for the one or more travel segments based, at least in part, on the one or more differences.

* * * * *